Patented May 4, 1937

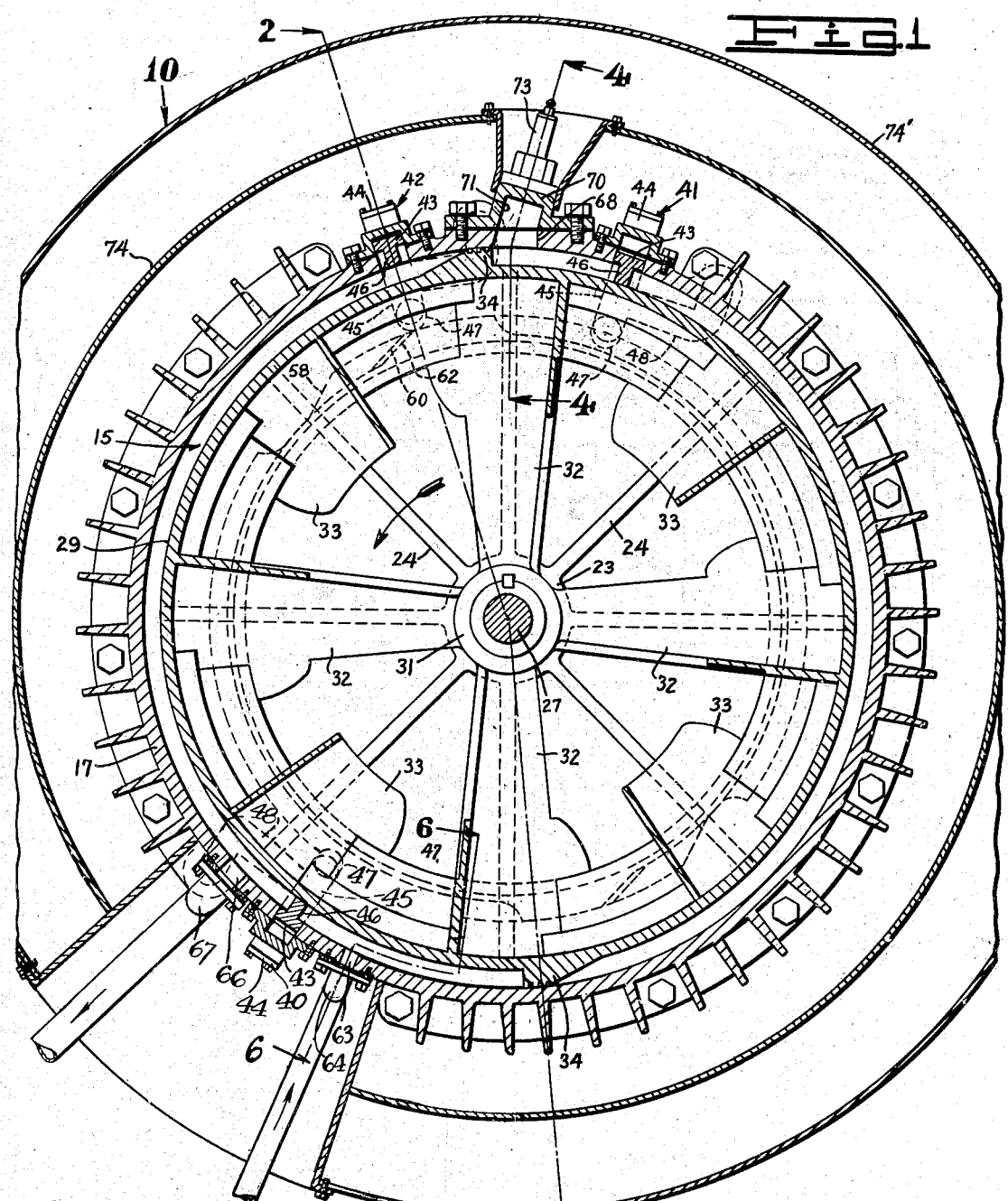
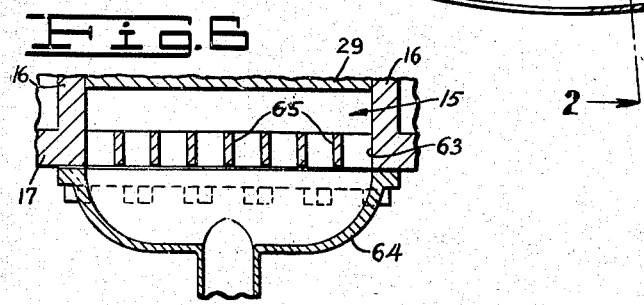

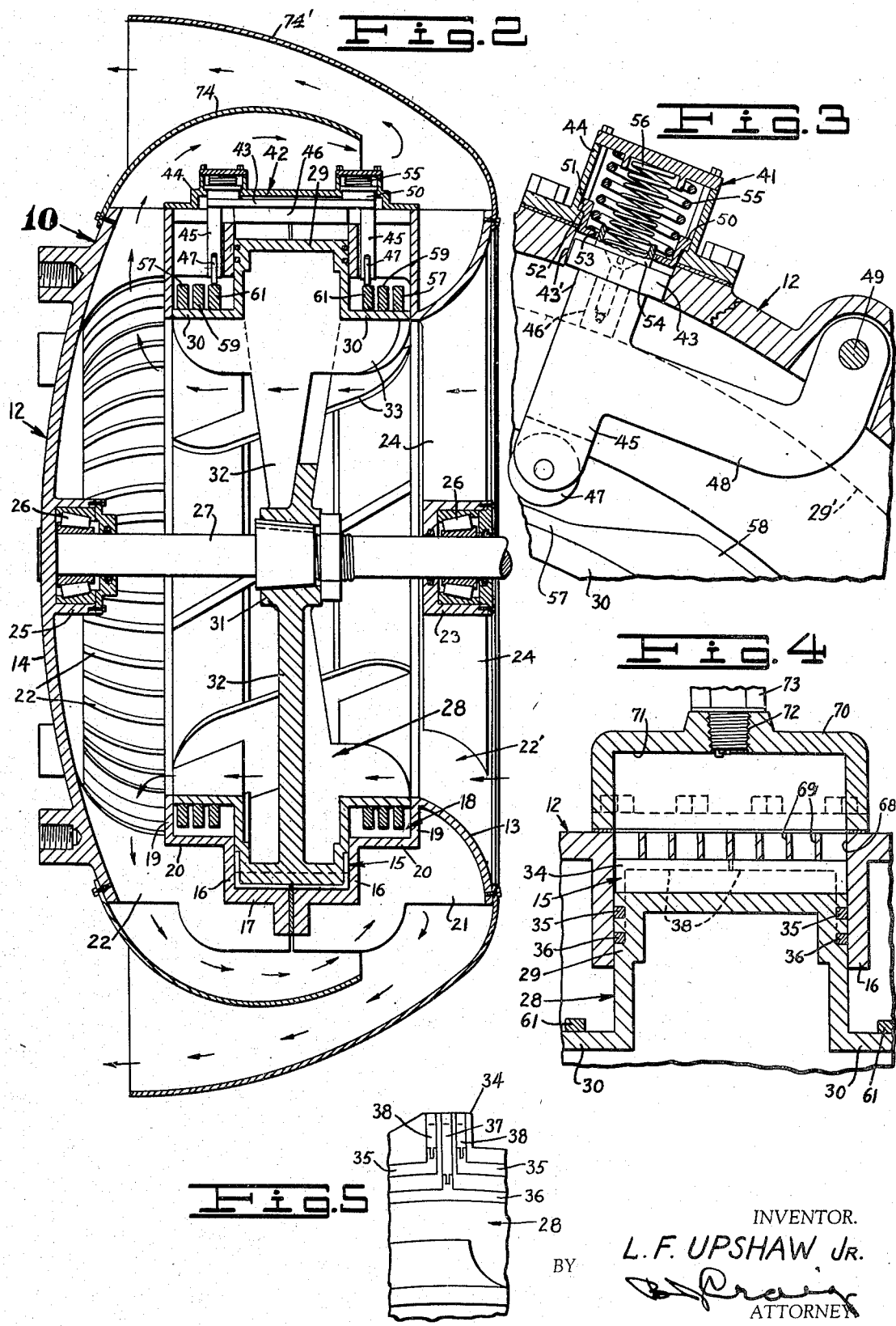

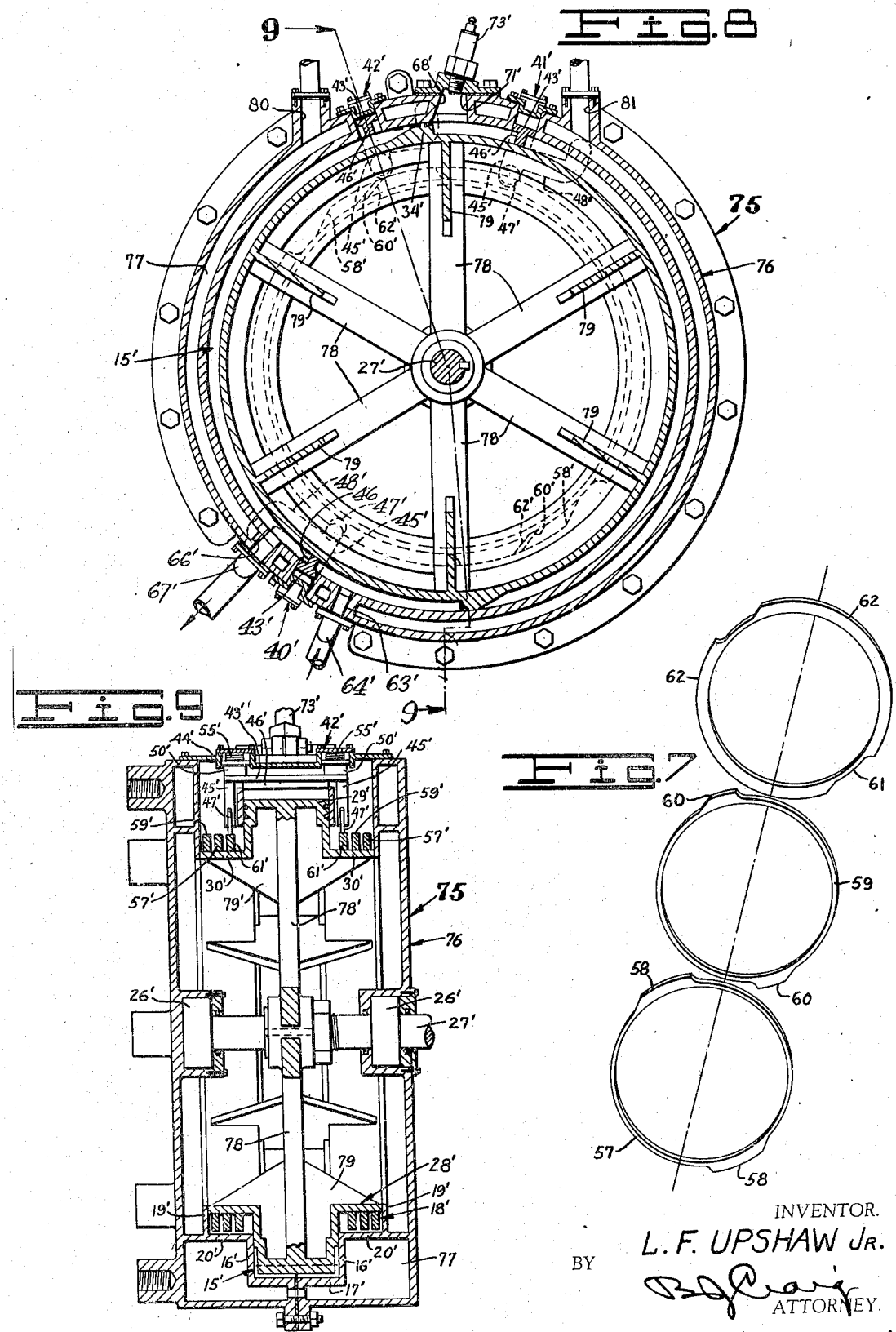

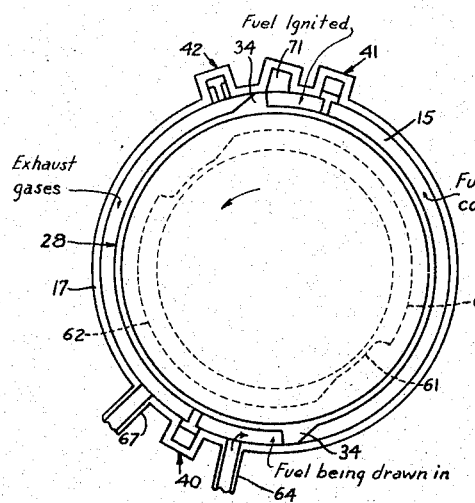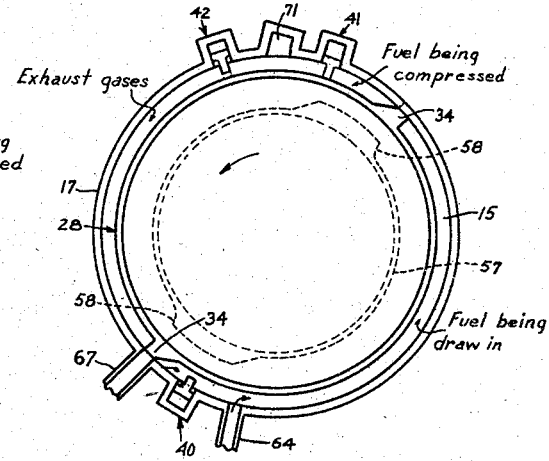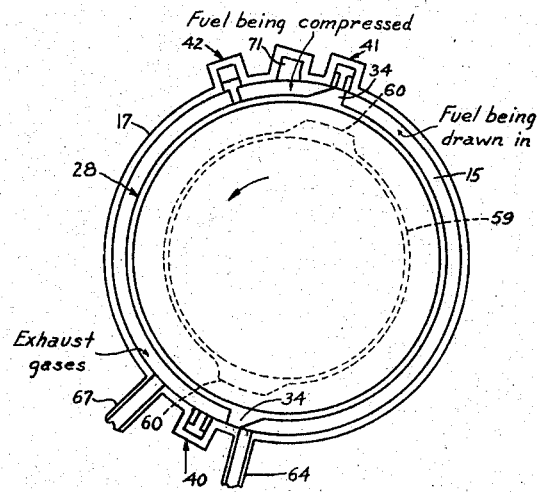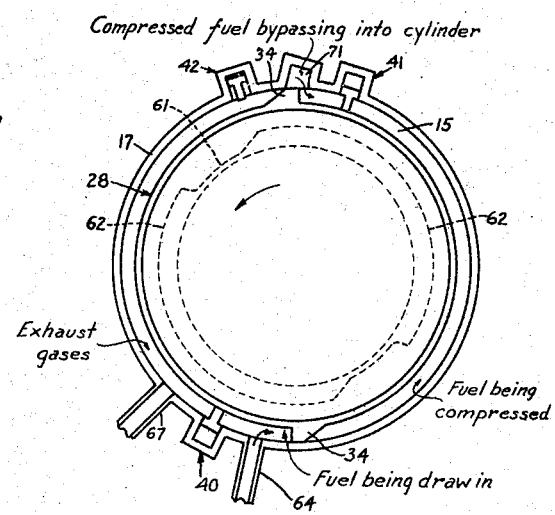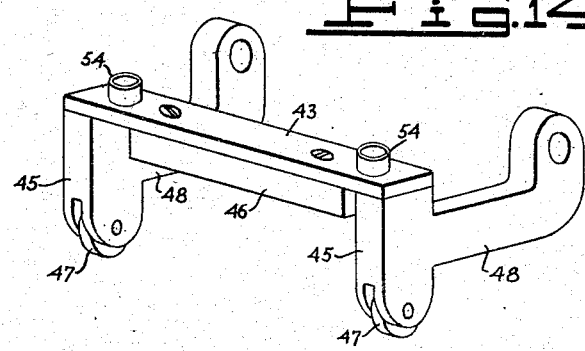

2,079,192

UNITED STATES PATENT OFFICE 2,079,192

ROTARY ENGINE

Lucius Forest Upshaw, Jr., Pasadena, Calif.

Application August 6, 1935, Serial No. 34,906

10 Claims. (Cl. 123—14)

This invention relates to rotary engines.

The general object of the invention is to provide an improved rotary engine which can be economically manufactured, which is simple in operation, and which is highly efficient in use.

A more specific object of the invention is to provide a rotary engine including a cylindrical housing having a rotor therein, and having vanes on the rotor; and wherein novel means is provided for introducing and firing a charge of fuel whereby an impulse is given to the engine.

A further object of the invention is to provide a rotary engine including a rotor having a vane thereon and wherein a charge of fuel is compressed in advance of the vane and is transferred to the rear of the vane where it is fired.

Other objects and the advantages of the invention will be apparent from the description taken in connection with the accompanying drawings, wherein:

Fig. 1 is a section through an engine embodying the features of my invention;

Fig. 2 is a section taken on line 2—2 of Fig. 1;

Fig. 3 is an enlarged fragmentary section of the engine showing details of one of the valve mechanism;

Fig. 4 is an enlarged fragmentary section taken on line 4—4 of Fig. 1;

Fig. 5 is a fragmentary enlarged side view of the rotor member;

Fig. 6 is an enlarged fragmentary section taken on line 6—6 of Fig. 1;

Fig. 7 is an extended perspective view of one set of cam rings shown on a reduced scale;

Fig. 8 is a view similar to Fig. 1 showing a modified form of engine;

Fig. 9 is a section taken on line 9—9 of Fig. 8;

Figs. 10 to 13, inclusive, are diagrammatic views showing the complete cycle of the operation of the motor; and Fig. 14 is a perspective view of one of the valve abutment members.

Referring to the drawings by reference characters I have indicated my improved engine generally at 10. As shown the engine 10 includes a circular casing 12 which includes a front wall 13 and a rear wall 14. The casing 12 has a circular channel 15 therein intermediate the front and rear walls which is formed by spaced side walls 16 and an outer wall 17. On each side of the channel 15 and inwardly therefrom the housing includes a channel 18 which is formed by side walls 19 and outer walls 20 which are integral with the walls 16. The walls forming one side of the channels 15 and 18 are connected to the front wall 13 by a plurality of spaced ribs 21 and the walls forming the other side are connected to the rear wall 14 by a plurality of spaced ribs 22.

The front wall 13 curves inwardly and is integrally connected with the forward side wall 19 of the channel 18 adjacent its inner end. The construction provides an aperture 22' in the front of the casing 12. Adjacent the front the casing 12 includes a boss 23 which is integrally connected to the front wall 13 by a plurality of spaced radial ribs 24 which extend across the aperture 22'. The rear wall 14 includes a boss 25. Suitably mounted in the bosses 23 and 25 I provide antifriction bearings 26 which support a shaft 27.

Positioned in the casing 12 I provide a rotor member 28 which includes an outer body portion 29, rim portions 30 of less diameter than the body and extending outwardly from each side of the body, a hub 31 and a plurality of spaced radial spokes 32 integrally connecting the body and the hub. As shown in Fig. 2 the hub 31 is suitably secured to the shaft 27 for rotation therewith. The spokes 32 are formed in the shape of fan blades so that when the rotor 28 turns in an anti-clockwise direction, air will be drawn into the casing through the front aperture thereof.

The rotor body 29 is preferably made hollow as shown and short, spaced, radial reinforcing ribs 33 are provided which extend across the wheel from adjacent the edge of one rim 30 to adjacent the edge of the other rim. The ribs 33 are positioned at the same pitch as the spokes 32 and act as impellers to draw air into the casing when the rotor turns. The body portion 29 of the wheel fits snugly in the casing channel 15 with the peripheral surface thereof spaced from the inner surface of the channel wall 17.

The rims 30 fit within the channels 18 and the inner surfaces thereof are preferably flush with the inner edges of the walls 19.

The rotor body 29 includes a pair of opposed integral vane members 34 which are the same width as the body and extend into the channel 15 to the outer wall thereof. The leading faces of the vanes 34 are preferably inclined as shown in Fig. 1 and the trailing faces are straight. On each side the body is suitably grooved to receive outer and inner piston rings 35 and 36 respectively. As shown in Fig. 5, the inner piston ring 36 adjacent each of the vanes 34 preferably includes a portion 37 which extends radially outward and then transversely halfway across the associated vane. Each outer piston ring 35 terminates on each side of the portion 37 of the ring 36 and includes portions 38 which, like the portion 37, extend radially outward and then transversely halfway across the associated vane.

The engine 10 adjacent the bottom thereof includes abutment indicated generally at 40 and adjacent the top includes a pair of spaced similar abutments 41 and 42. As all the abutments are similar, but one of them will be described in detail and in Fig. 3 I have shown an enlarged detail view of the abutment 41. As shown the abutment 41 includes a transverse bar 43 which is positioned in an aperture 43' in the wall 17 of the casing. The aperture 43' is closed by a housing 44 which is removably secured to the casing 12. The bar 43 extends on each side beyond the side walls 16 of the channel 15 and has inwardly extending legs 45 secured thereto. Intermediate its length the bar 43 includes an inwardly extending fin portion 46 which fits snugly within the channel 15 and forms a transverse partition thereacross from one side wall to the other.

Each of the legs 45 adjacent their inner ends has a roller member 47 rotatably mounted thereon and intermediate their lengths each of the legs includes an arm 48 which extends in a direction opposite to the direction of rotation of the rotor 28. The ends of the arms 48 are pivotally mounted on pins 49 which are suitably supported by the casing 12.

Adjacent each of the legs 45 the housing 44 has a cup-shaped member 50 therein which adjacent its outer end includes an enlarged flange 51 which is adapted to engage a shoulder portion 52 of the housing to limit the inward travel of the cup member. The cup member 50 has an aperture 53 in the bottom wall thereof in which a hollow boss 54 integral with the bar 43 is positioned.

Positioned in the cup and surrounding the aperture 53 I provide a heavy coiled compression spring 55 one end of which engages the bottom wall of the cup member and the opposite end engages the top wall of the housing 44. Positioned in the hollow boss 54 I provide a coiled compression spring 56 one end of which engages the boss 54 while the opposite end engages the top wall of the housing 44. The spring 56 is lighter and of less compressive strength than the spring 55.

For actuating the valve 41 I provide a cam ring 57 having a pair of opposed enlarged working cam portions 58 thereon (see Fig. 7). For actuating the abutment 40 I provide a pair of cam rings 59 having an enlarged working cam portion 60 thereon, and for actuating the valve 42 I provide a pair of cam rings 61 having enlarged working cam portions 62 thereon. The cam rings 57, 59, and 61 are mounted in correct relation on the wheel rims 30 and suitably secured thereto.

The springs 56 resiliently urge the bar 43 and the fin 46 downward to a position wherein the inner end of the fin 46 firmly engages the peripheral surface of the wheel body 29. When the fin 46 thus engages the wheel body the rollers 47 are out of engagement with the cam ring as shown in Fig. 3. When the working cam portions 58 engage the rollers 47 they move the legs 45, the bar 43, and the fin 46 outward against the action of the springs 56. After the bar has moved outward a predetermined distance it engages the cup 50 and moves it outward against the action of the spring 55. When the working cam portion 58 has passed the legs 45 the springs 55 and 56 both force the bar 43 inward until the cup flanges 51 engage the shoulders 52 whereupon the springs 55 cease to extend force on the bar but the springs 56 continue to force the bar 43 inwardly until the fin 46 engages the peripheral surface of the wheel body 29.

At the side of the abutment 40 in the direction of rotation of the rotor, the casing 12 has a fuel intake port 63 therein which opens into the channel 15 and communicates with a fuel intake manifold 64. As shown in Fig. 6 the port 63 has a plurality of spaced ribs 65 thereacross to prevent the portions 37 and 38 of the piston rings from becoming displaced when the vanes pass the port.

On the opposite side of the abutment 40 the casing 12 has an exhaust port 66 therein which opens into the channel 15 and communicates with an exhaust manifold 67. The exhaust port 66, like the intake port 63, has a plurality of ribs thereacross.

Between the abutments 41 and 42 the casing 12 has an aperture 68 therein which opens into the channel 15 and has a plurality of spaced ribs 69 thereacross similar to the intake port. (See Fig. 4.) Over the aperture 68 I provide a housing 70 which has a recess 71 therein which communicates with the aperture 68. The housing further includes a threaded aperture 72 opening into the chamber 71 and in which a spark plug 73 is positioned. Any suitable type of ignition and timing system may be used to direct electric current to the spark plug 73.

The rear wall 14 has a sheet metal apron member 74 secured thereto which curves forwardly over the outer periphery of the casing and terminates at a location spaced from the front wall. The front wall 13 has a similar sheet metal apron member 74' secured thereto which curves upwardly and rearwardly over the casing and over the member 74 with a space between itself and the member 74.

In operation, to start the engine the shaft is first rotated in an anti-clockwise direction thereby rotating the wheel 28 and as the wheel rotates the vane 34 adjacent the intake port 63 draws fuel into the chamber 15 and as the wheel continues to rotate until the next vane 34 passes the abutment 40 the second abutment draws fuel into the chamber behind it and in front compresses the fuel in the channel 15 between its forward face and the fin 46 of the abutment 42.

In Figs. 10 to 13, inclusive, of the drawings, I have illustrated the various cycles of operation of my motor. In Fig. 10 at the top the fuel has been ignited and the gases are expanding so that the rotor is urged in an anti-clockwise direction and at the bottom fresh fuel is being drawn into the chamber. In Fig. 11 at the top fuel is being compressed between the abutment 42 and the vane member while at the bottom the exhaust gases are being expelled and the fuel charge is further drawn into the cylinder.

In Fig. 12 at the top the fuel has been further compressed and is almost ready to be by-passed, while at the bottom one exhaust cycle has been completed and the introduction of fuel is almost completed. In Fig. 13 at the top the fuel is being by-passed around the vane while at the bottom the inlet of fuel has been completed and compression has started. During these various operations the abutments 40, 41, and 42 have been operated inwardly and outwardly by the cams on the ring members as previously described.

The cam portions 58 of the cam ring 57 are preferably so located relative to the vanes 34 that they actuate the abutment 41 to an open position when the vane has compressed the fuel to one sixth its initial volume. The cam portions 62 of the cam rings 61 are so positioned that when the abutment 41 is open the abutment 42 is closed and remains closed until the outer forward edge of the vane slightly passes the forward edge of the aperture 68. At all other times the abutment 42 remains open.

When the abutment 41 opens, the compressed fuel flows by this abutment and into the space between the vane and the fin 46 of the abutment 42. As soon as the vane passes the fin 46 of the valve 41, the valve 41 again closes. As the rotor continues to turn the vane travels towards the forward edge of the aperture 68 and just as its rear face approaches the forward edge of the aperture 68 the fuel is ignited by the spark plug 73 whereupon the fuel expands between the rear of the vane and the fin of the abutment 41 thus exerting a force on the rear face of the vane which gives an impulse to the rotor 28 tending to turn the latter. When the vane approaches the abutment 40 the cam portions 60 of the cam rings 59 actuate the abutment 40 to an open position to allow the vane to pass thereby. When the vane passes the exhaust port 66 the expanded gases therebehind pass out of the chamber 15 through the port 66 and into the exhaust manifold 67. When the next vane passes the aperture 68 and the abutment 42 opens it forces the remaining exhaust gases of the previously fired fuel out of the chamber 15 through the exhaust port 66.

As the rotor 28 turns, the spoke blades 32 and the rib blades 33 thereof draw air into the casing 12 and force it out between the ribs 22 where it is directed forwardly over the top of the casing by the member 74 and then rearwardly over the member 74 by the member 74'. Thus it will be seen that air is circulated around all sides of the working chamber 15 and the chamber 18 and against the inner surface of the wheel body 29 and the rims 30.

In Figs. 8 and 9 I have indicated a modified form of my engine generally at 75. As shown the engine 75 is similar to the engine 10 except that it includes a housing 76 which is chambered as at 77 to form a water jacket for cooling the engine and the rotor spokes 78 and ribs 79 are straight instead of pitched, otherwise all parts of the engine 75 are similar to the engine 10 and like parts thereof are indicated by similarly primed reference numerals.

The housing 76 includes a water inlet port 80 which communicates with the water chamber 77 and a water outlet port 81 which communicates with the water chamber 77. Water is circulated through the water chamber by any suitable type of water pump.

From the foregoing description it will be apparent that I have provided a novel engine which is simple in construction and highly efficient in use.

Having thus described my invention, I claim:

1. In an engine, a housing having an inwardly opening circular groove therein, a shaft, the axis of said shaft being coaxial with the axis of said groove, means to rotatably support said shaft in said housing, a rotor mounted on said shaft, said rotor including a circular body portion positioned in said groove, the peripheral surface of said rotor being spaced inward from the inner surface of said groove and forming a closed chamber, said housing having a fuel intake port and an exhaust port, a spark plug extending into said chamber, said rotor having a pair of opposed vanes thereon extending into said chamber, three spaced abutments pivotally mounted in said housing, each of said abutments including a fin portion extending into said chamber to form a transverse partition therein, each of said abutments including a pair of spaced arms, one positioned adjacent each side of said chamber, one end of said arms being secured to said abutment and the opposite ends of said arms being pivotally secured to said housing, a pair of cam rings for shifting each of said abutments, said cam rings being positioned one adjacent each side of said chamber, said cam rings including enlarged cam working surfaces, said abutment arms including cam engaging portions, said cam engaging portions being out of engagement with said cam rings and being engaged by said enlarged cam working surfaces, said enlarged cam working surfaces being adapted to move said abutments to move said fin portions thereof out of the path of travel of said vanes and means to move said abutments to move said fin portions thereof into the path of travel of said vanes.

2. In an engine, a housing having an inwardly opening circular groove therein, a shaft, a rotor on said shaft, said rotor having a rim, said rotor having a pair of diametrically opposed vanes thereon extending into said chamber, three abutments in spaced circumferential relation in said housing, each of said abutments including a portion projecting into said chamber, said abutments each including an arm, said arm being pivotally mounted in said housing, said arm being disposed at one side of said chamber, three cam rings mounted on said rims, the inner of said cam rings having a cam surface thereon engaging one of said arms, the intermediate of said cam rings having a cam surface thereon engaging another of said arms, and the outer of said cam rings having a cam surface thereon engaging the third arm, said housing having an exhaust outlet and also having a fuel inlet adjacent one of said pivoted abutments, said other two abutments being arranged adjacent each other and remote from the one abutment, said housing having a by-pass chamber between said two abutments and a spark plug in said by-pass chamber.

3. In an engine, a housing having an inwardly opening circular groove therein, a shaft, a rotor on said shaft having rims thereon, said rotor having a pair of diametrically opposed vanes thereon extending into said chamber, three abutments in spaced circumferential relation in said housing, each of said abutments including a portion projecting into said chamber, said abutments each including a pair of spaced arms, said arms being pivotally mounted in said housing, said arms being disposed one of each side of said chamber, a set consisting of three pairs of cam rings mounted on said rims, the inner pair of said cam rings having identical cam surfaces thereon, the intermediate pair of said cam rings having identical cam surfaces thereon, and the outer pair of said cam rings having identical cam surfaces thereon, one of said pair of arms engaging one pair of the cam rings, another of said arms engaging another pair of cam rings, and the third pair of arms engaging the third pair of cam rings, said housing having an exhaust outlet and also having a fuel inlet adjacent one of said pivoted abutments, said other two abutments being arranged adjacent each other and remote from the one abutment, said housing having a by-pass chamber between said two abutments and a spark plug in said by-pass chamber.

4. In an engine, a housing having an inwardly opening circular groove therein, a shaft, a rotor on said shaft, said rotor on each side of said circular body portion having rims, said rotor having a pair of diametrically opposed vanes thereon extending into said chamber, three abutments in spaced circumferential relation in said housing, each of said abutments including a portion projecting into said chamber, said abutments each including a pair of spaced arms, said arms being pivotally mounted in said housing, said arms being disposed one at each side of said chamber, three pairs of cam rings mounted on said rims, the inner pair of said cam rings having cam surfaces thereon engaging one of said pair of arms, the intermediate pair of said cam rings having cam surfaces thereon engaging another of said pair of arms, and the outer pair of said cam rings having cam surfaces thereon engaging the third pair of arms, said housing having an exhaust outlet and also having a fuel inlet adjacent one of said pivoted abutments, said other two abutments being arranged adjacent each other and remote from the one abutment, said housing having a by-pass chamber between said two abutments and a spark plug in said by-pass chamber.

5. In an engine, a housing having an inwardly opening circular groove therein, a shaft, a rotor on said shaft, said rotor having rims thereon, said rotor having a pair of diametrically opposed vanes thereon extending into said chamber and engaging the wall of said groove, three abutments in spaced circumferential relation in said housing, each of said abutments including at one end a fin portion projecting into said chamber, said abutments each including a pair of spaced arms, said arms being pivotally mounted in said housing, said arms including roller members, said arms being pivotally mounted in said housing, said arms including roller members, said arms being disposed one at each side of said chamber, a set of three pairs of cam rings mounted on said rims, the inner pair of said cam rings having identical cam surfaces thereon, the intermediate pair of said cam rings having identical cam surfaces thereon, and the outer pair of said cam rings having identical cam surfaces thereon, the rollers on one of said pair of arms engaging one pair of the cam rings, the rollers of another of said arms engaging another pair of cam rings, and the roller of a third pair of arms engaging the third pair of cam rings, said housing having an exhaust outlet and also having a fuel inlet adjacent one of said pivoted abutments, said other two abutments being arranged adjacent each other and remote from the one abutment, said housing having a by-pass chamber between said two abutments and a spark plug in said by-pass chamber.

6. In an engine, a housing having an inwardly opening circular groove therein, a shaft, means to rotatably support said shaft in said housing with its axis concentric with the axis of said groove, a rotor on said shaft, said rotor including a circular body portion positioned in and closing said groove, said rotor on each side of said circular body portion having rims of less diameter than the body portion, the body portion being spaced inward from the inner surface of the groove to form a closed chamber, said rotor having a plurality of diametrically opposed vanes thereon extending into said chamber and engaging the wall of said groove, three abutments in spaced circumferential relation in said housing, each of said abutments including at one end a fin portion projecting into said chamber, said abutments each including a pair of spaced arms, said arms being pivotally mounted in said housing, said arms including roller members, said arms being disposed one at each side of said chamber, a set of three pairs of cam rings mounted on said rims, the inner pair of said cam rings having identical cam surfaces thereon, the intermediate pair of said cam rings having identical cam surfaces thereon, and the outer pair of said cam rings having identical cam surfaces thereon, the rollers on one of said pair of arms engaging one pair of the cam rings, the rollers of another of said arms engaging another pair of cam rings, and the roller of a third pair of arms engaging the third pair of cam rings, said housing having an exhaust outlet and also having a fuel inlet adjacent one of said pivoted abutments, said other two abutments being arranged adjacent each other and remote from the one abutment, said housing having a by-pass chamber between said two abutments, a spark plug in said by-pass chamber, the front of said vane members being inclined and the rear of said vane members being diametrically disposed.

7. In an engine, a housing having an inwardly facing circular groove therein, a shaft, means to rotatably support said shaft in said housing with its axis concentric to the axis of the groove, a rotor on said shaft, said rotor including a circular body portion positioned in and closing said groove, means on said circular body portion and engaging the wall of said groove to provide a leak-tight joint, a plurality of arms pivoted on said housing about axes disposed outside of the circular grooves, each of said arms including an abutment movable radially into and out of said groove, cam engaging means on said arms, said groove having a fuel inlet and outlet and a spark plug communicating with said groove, said cam engaging means being disposed within the periphery of the circular groove and cam actuating means on said rotor for moving said cam means.

8. In an engine, a housing having an inwardly opening circular groove therein, a shaft, means to rotatably support said shaft in said housing with its axis concentric with the axis of said groove, a rotor on said shaft, said rotor including a circular body portion positioned in and closing said groove, a plurality of pairs of arms mounted on said housing, each of said arms including a portion attached to the housing and a portion disposed at each side of said groove, a transverse bar connecting each pair of arms, each of said bars having an inwardly extending fin portion thereon which is disposed snugly within said circular groove to form a transverse partition thereacross and means to move said arms so that the fin portion moves into and out of said groove, said groove having a fuel inlet and outlet and a spark plug communicating with said groove.

9. In an engine, a housing having an inwardly opening circular groove therein, a shaft, means to rotatably support said shaft in said housing with its axis concentric with the axis of said groove, a rotor on said shaft, said rotor including a circular body portion positioned in and closing said groove, said rotor on one side of said circular body portion having a rim of less diameter than the body portion, the body portion being spaced inward from the inner surface of the groove to form a closed chamber, said rotor having a plurality of opposed vanes thereon extending into said chamber and engaging the wall of said groove, a plurality of abutments in spaced circumferential relation in said housing, each of said abutments including a fin portion projecting into said chamber, said abutments each including an arm, said arm being pivotally mounted on said housing, said arm being disposed at one side of said chamber, a plurality of cam rings mounted on said rim, said cam rings having cam surfaces thereon engaging the arms, said housing having an exhaust outlet and also having a fuel inlet adjacent one of said pivoted abutments, said housing having a by-pass chamber between said two abutments, a spark plug in said by-pass chamber.

10. In an engine, a housing having an inwardly opening circular groove therein, a shaft, means to rotatably support said shaft in said housing with its axis concentric with the axis of said groove, a rotor on said shaft, said rotor including a circular body portion positioned in and closing said groove, said rotor on one side of said circular body portion having a rim of less diameter than the body portion, the body portion being spaced inward from the inner surface of the groove to form a closed chamber, said rotor having a plurality of diametrically opposed vanes thereon extending into said chamber and engaging the wall of said groove, three abutments in spaced circumferential relation in said housing, each of said abutments at one end including a transverse bar, said bar having a fin portion projecting into said chamber, said abutments each including an arm, said arm being pivotally mounted on said housing, said arm including a roller member, said arm being disposed at one side of said chamber, a set of three cam rings mounted on said rim, said cam rings having cam surfaces thereon, the roller on said arm engaging the cam rings, said housing having an exhaust outlet and also having a fuel inlet adjacent one of said pivoted abutments, said other two abutments being arranged adjacent each other and remote from the one abutment, said housing having a by-pass chamber between said two abutments, a spark plug in said by-pass chamber, the front of said vane members being inclined and the rear of said vane members being diametrically disposed.

LUCIUS FOREST UPSHAW, Jr.